US010983951B1

(12) United States Patent
Kuang et al.

(10) Patent No.: US 10,983,951 B1
(45) Date of Patent: Apr. 20, 2021

(54) RECOVERY PROCESSING FOR PERSISTENT FILE DATA CACHE TO REDUCE DATA LOSS

(71) Applicant: EMC IP Holding Company LLC, Hopkinton, MA (US)

(72) Inventors: Yaming Kuang, Shanghai (CN); Yunfei Chen, Shanghai (CN); Philippe Armangau, Acton, MA (US); Kamakshi Viswanadha, Lexington, MA (US); Yubing Wang, Southborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 580 days.

(21) Appl. No.: 15/279,983

(22) Filed: Sep. 29, 2016

(51) Int. Cl.
*G06F 16/11* (2019.01)
*G06F 16/23* (2019.01)
*G06F 16/13* (2019.01)
*G06F 16/172* (2019.01)

(52) U.S. Cl.
CPC ............ *G06F 16/128* (2019.01); *G06F 16/13* (2019.01); *G06F 16/172* (2019.01); *G06F 16/2365* (2019.01)

(58) Field of Classification Search
CPC .... G06F 16/128; G06F 16/2365; G06F 16/13; G06F 16/172
USPC ........................................................ 707/691
See application file for complete search history.

(56) References Cited

U.S. PATENT DOCUMENTS

| 5,819,292 | A | * | 10/1998 | Hitz | G06F 11/1435 714/15 |
| 5,893,920 | A | * | 4/1999 | Shaheen | G06F 12/0813 711/133 |
| 7,379,954 | B2 | * | 5/2008 | Shoens | G06F 17/30088 |
| 7,689,599 | B1 | * | 3/2010 | Shah | G06F 11/1471 714/19 |
| 7,814,057 | B2 | * | 10/2010 | Kathuria | G06F 11/1471 707/646 |
| 8,661,068 | B1 | * | 2/2014 | Seibel | G06F 16/172 707/825 |
| 8,782,003 | B1 | * | 7/2014 | Patterson | G06F 16/1734 707/624 |
| 8,818,951 | B1 | * | 8/2014 | Muntz | G06F 16/13 707/639 |

(Continued)

*Primary Examiner* — Tony Mahmoudi
*Assistant Examiner* — Michael Le
(74) *Attorney, Agent, or Firm* — Muirhead and Saturnelli, LLC

(57) ABSTRACT

Processing for a file system may include determining an inconsistency between a data log and inodes (index nodes) of the file system. Responsive to determining the inconsistency, recovery processing may be performed including first processing of the data log, second processing of the inodes of the file system, and third processing of the data log after said second processing. First processing may, for each entry of the data log that records a create snapshot operation to create a snapshot of a file having an associated inode of the file system that is a dirty snapshot inode, marking the associated inode as "snap validated". Second processing may include freeing each dirty snapshot inode not marked as "snap validated". Third processing may include freeing any entry of the data log where the entry references dirty snapshot inode freed by the second processing.

20 Claims, 11 Drawing Sheets

(56) References Cited

U.S. PATENT DOCUMENTS

| | | | |
|---|---|---|---|
| 8,943,282 B1* | 1/2015 | Armangau | G06F 16/128 |
| | | | 711/162 |
| 9,003,227 B1* | 4/2015 | Patel | G06F 11/1435 |
| | | | 714/15 |
| 9,020,903 B1* | 4/2015 | Vempati | G06F 3/0619 |
| | | | 707/674 |
| 9,152,353 B1* | 10/2015 | Wang | G06F 3/0689 |
| 9,208,031 B2* | 12/2015 | Mace | G06F 11/1471 |
| 9,367,395 B1 | 6/2016 | Bono et al. | |
| 9,734,021 B1* | 8/2017 | Sanocki | H04L 41/0654 |
| 2004/0267835 A1* | 12/2004 | Zwilling | G06F 11/2097 |
| 2005/0165617 A1* | 7/2005 | Patterson | G06F 3/065 |
| | | | 705/59 |
| 2006/0106860 A1* | 5/2006 | Dee | G06F 16/2246 |
| 2006/0129612 A1* | 6/2006 | MacCormick | G06F 11/1469 |
| 2008/0189343 A1* | 8/2008 | Hyer | G06F 3/0614 |
| 2009/0044046 A1* | 2/2009 | Yamasaki | G06F 11/2082 |
| | | | 714/6.1 |
| 2011/0145363 A1* | 6/2011 | Ananthanarayanan | |
| | | | G06F 16/172 |
| | | | 709/218 |
| 2011/0258164 A1* | 10/2011 | Mandagere | G06F 11/1435 |
| | | | 707/685 |
| 2012/0151245 A1* | 6/2012 | Chang | G06F 16/1865 |
| | | | 714/4.1 |
| 2014/0089264 A1* | 3/2014 | Talagala | G06F 11/1471 |
| | | | 707/649 |
| 2014/0101108 A1* | 4/2014 | Stewart | G06F 11/1458 |
| | | | 707/649 |
| 2014/0108352 A1* | 4/2014 | Ahrens | G06F 11/1451 |
| | | | 707/645 |
| 2015/0106342 A1* | 4/2015 | Liang | G06F 12/0806 |
| | | | 707/690 |
| 2017/0060702 A1* | 3/2017 | Dave | G06F 11/1451 |
| 2017/0097873 A1* | 4/2017 | Krishnamachari | G06F 3/0688 |
| 2017/0132429 A1* | 5/2017 | Bell | H04L 9/0861 |
| 2017/0277739 A1* | 9/2017 | Joseph | G06F 3/0643 |

* cited by examiner

| Data Blocks (DBs) 202 | Indirect Blocks (IBs) 204 | Inodes 206 | Other Metadata (MD) 208 |

RECOVERY PROCESSING FOR PERSISTENT FILE DATA CACHE TO REDUCE DATA LOSS

BACKGROUND

Technical Field

This application generally relates to data storage and more particularly to recovery processing due to file system inconsistencies.

Description of Related Art

Systems may include different resources used by one or more host processors. Resources and host processors in the system may be interconnected by one or more communication connections, such as network connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host may perform a variety of data processing tasks and operations using the data storage system. For example, a host may perform basic system I/O (input/output) operations in connection with data requests, such as data read and write operations.

Host systems may store and retrieve data using a data storage system containing a plurality of host interface units, disk drives (or more generally storage devices), and disk interface units. Such data storage systems are provided, for example, by EMC Corporation of Hopkinton, Mass. The host systems access the storage devices through a plurality of channels provided therewith. Host systems provide data and access control information through the channels to a storage device of the data storage system and data of the storage device is also provided from the data storage system to the host systems also through the channels. The host systems do not address the disk drives of the data storage system directly, but rather, access what appears to the host systems as a plurality of files, objects, logical units, logical devices or logical volumes. These may or may not correspond to the actual physical drives. Allowing multiple host systems to access the single data storage system allows the host systems to share data stored therein.

SUMMARY OF THE INVENTION

In accordance with one aspect of the techniques herein is a method of performing processing for a file system comprising: determining, for the file system, an inconsistency between a data log for the file system and inodes (index nodes) of the file system, wherein the data log includes entries corresponding to logged operations requested with respect to the file system; and responsive to determining the inconsistency, performing recovery processing including: performing first processing of the data log, wherein said first processing includes, for each entry of the data log that records a create snapshot operation to create a snapshot of a file having an associated inode of the file system that is a dirty snapshot inode, marking said associated inode as snap validated; performing second processing of the inodes of the file system, wherein said second processing includes freeing each inode of the file system that is a dirty snapshot inode and where said each inode is not also marked as snap validated; and performing third processing of the data log after said second processing, wherein said third processing includes freeing any entry of the data log where said any entry references an inode of the file system that is freed by said second processing. The inconsistency may include any one or more of: a write operation having an entry in the data log that refers to an invalid inode in the file system; a dirty snapshot inode for a first snapshot of a file in the file system that does not have a corresponding entry in the data log for an operation that creates the first snapshot; and an entry in the data log for an operation that creates a second snapshot of a file in the file system and the second snapshot does not have a corresponding dirty snapshot inode. The file system may include a first file that implements a logical device having storage provisioned from the file system. The logical device may be a virtually provisioned logical device. The first file may have a corresponding index node of the file system. The index node may include metadata for the first file and the index node may include a mapping structure of one or more indirect blocks and one or more data blocks that are mapped, using the one or more indirect blocks, to the index node for the first file. The data log may include a first entry that records a first operation to create a first snapshot of the first file, wherein the first snapshot of the first file may denote a first snapshot of the logical device. Responsive to receiving the first operation to create the first snapshot of the first file, processing may be performed including: allocating a first index node of the file system for the first snapshot of the first file; and recording information in the first entry, the information including a first inode number of the first index node. The method may include flushing the data log including flushing the first entry; and responsive to said flushing the first entry, completing initialization of metadata of the first index node to reference a same set of data blocks allocated for the first file.

In accordance with another aspect of the techniques described herein is a system comprising: one or more processors; and a memory comprising code stored therein that, when executed by at least one of the one or more processors, performs a method of performing processing for a file system comprising: determining, for the file system, an inconsistency between a data log for the file system and inodes (index nodes) of the file system, wherein the data log includes entries corresponding to logged operations requested with respect to the file system; responsive to determining the inconsistency, performing recovery processing including: performing first processing of the data log, wherein said first processing includes, for each entry of the data log that records a create snapshot operation to create a snapshot of a file having an associated inode of the file system that is a dirty snapshot inode, marking said associated inode as snap validated; performing second processing of the inodes of the file system, wherein said second processing includes freeing each inode of the file system that is a dirty snapshot inode and where said each inode is not also marked as snap validated; and performing third processing of the data log after said second processing, wherein said third processing includes freeing any entry of the data log where said any entry references an inode of the file system that is freed by said second processing.

In accordance with another aspect of techniques described herein is a computer readable medium comprising code stored thereon that, when executed, performs a method of processing for a file system comprising: determining, for the file system, an inconsistency between a data log for the file system and inodes (index nodes) of the file system, wherein the data log includes entries corresponding to logged operations requested with respect to the file system; and responsive to determining the inconsistency, performing recovery processing including: performing first processing of the data log, wherein said first processing includes, for each entry of the data log that records a create snapshot operation to create a snapshot of a file having an associated inode of the file system that is a dirty snapshot inode, marking said associated inode as snap validated; performing second processing of the inodes of the file system, wherein said second processing includes freeing each inode of the file system that is a dirty snapshot inode and where said each inode is not also marked as snap validated; and performing third processing of the data log after said second processing, wherein said third processing includes freeing any entry of the data log where said any entry references an inode of the file system that is freed by said second processing. The inconsistency may include any one or more of: a write operation having an entry in the data log that refers to an invalid inode in the file system; a dirty snapshot inode for a first snapshot of a file in the file system that does not have a corresponding entry in the data log for an operation that creates the first snapshot; and an entry in the data log for an operation that creates a second snapshot of a file in the file system and the second snapshot does not have a corresponding dirty snapshot inode. The file system may include a first file that implements a logical device having storage provisioned from the file system. The logical device may be a virtually provisioned logical device. The first file may have a corresponding index node of the file system. The index node may include metadata for the first file and a mapping structure of one or more indirect blocks and one or more data blocks that are mapped, using the one or more indirect blocks, to the index node for the first file. The data log may include a first entry that records a first operation to create a first snapshot of the first file, wherein the first snapshot of the first file may denote a first snapshot of the logical device. Responsive to receiving the first operation to create the first snapshot of the first file, processing may performed including: allocating a first index node of the file system for the first snapshot of the first file; and recording information in the first entry, the information including a first inode number of the first index node. The method may include flushing the data log including flushing the first entry; and responsive to said flushing the first entry, completing initialization of metadata of the first index node to reference a same set of data blocks allocated for the first file.

BRIEF DESCRIPTION OF THE DRAWINGS

Features and advantages of the present invention will become more apparent from the following detailed description of exemplary embodiments thereof taken in conjunction with the accompanying drawings in which:

FIG. 3 is an example illustrating a file system address space in an embodiment in accordance with techniques herein;

DETAILED DESCRIPTION OF EMBODIMENT(S)

Figure 1:
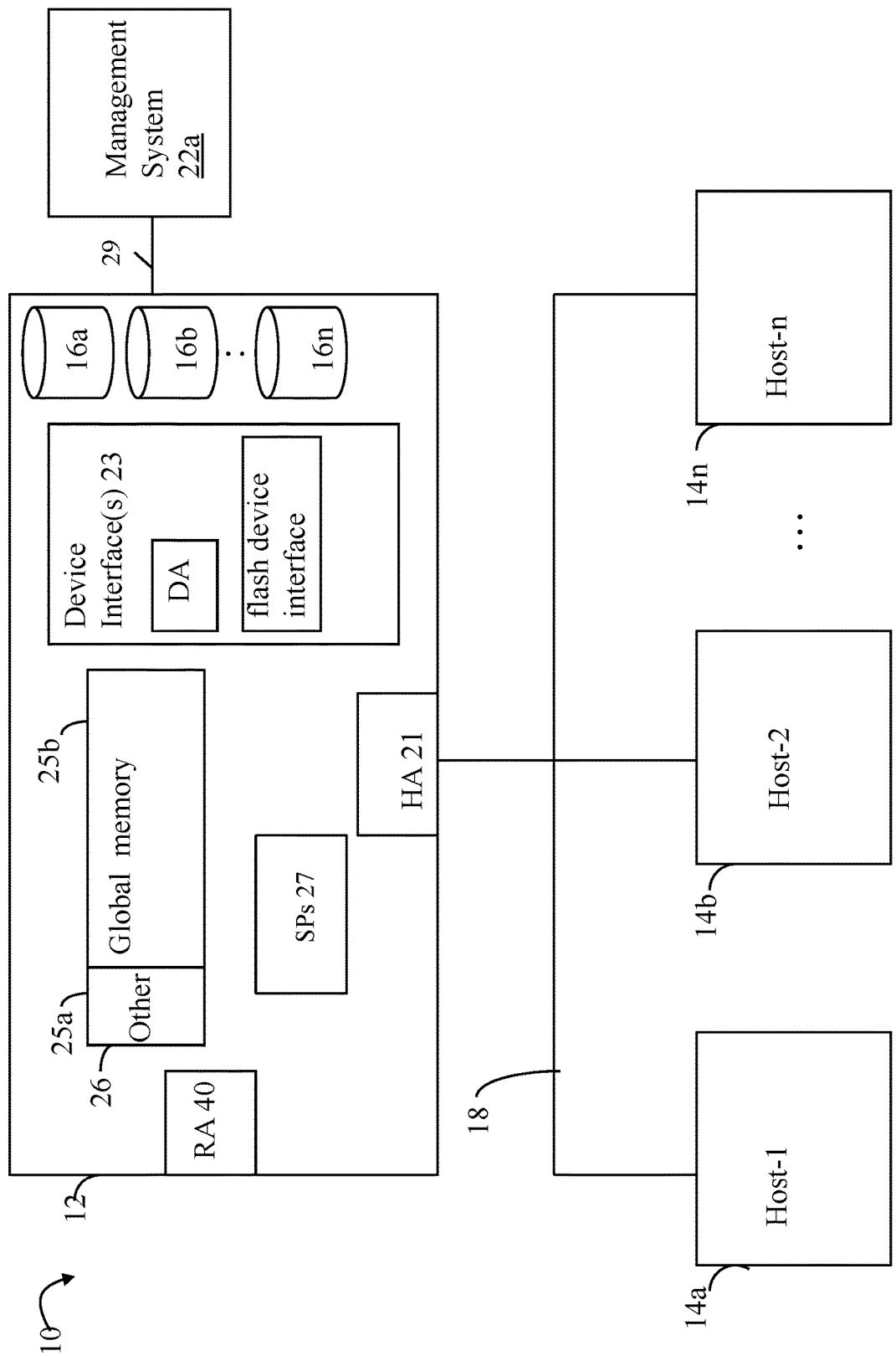
FIG. 1 is an example of components that may be included in a system in accordance with techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the computer system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as block-based protocols (e.g., SCSI, Fibre Channel, iSCSI), file system-based protocols (e.g., NFS), and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14*a*-14*n* may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 12 may be a data storage array including a plurality of data storage devices 16*a*-16*n*. The data storage devices 16*a*-16*n* may include one or more types of physical data storage devices (PDs or physical devices denoting backend, non-volatile storage) such as, for example, one or more rotating disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving mechanical parts.

The flash devices may be constructed using nonvolatile semiconductor NAND flash memory. The flash devices may include one or more SLC (single level cell) devices and/or MLC (multi level cell) devices.

The techniques herein may be generally used in connection with any type of flash device, or more generally, any SSD technology. The flash device may be, for example, a flash device which is a NAND gate flash device, NOR gate flash device, flash device that uses SLC or MLC technology, and the like, as known in the art. In one embodiment, the one or more flash devices may include MLC flash memory devices although an embodiment may utilize MLC, alone or in combination with, other types of flash memory devices or other suitable memory and data storage technologies. More generally, the techniques herein may be used in connection with other SSD technologies although particular flash memory technologies may be described herein for purposes of illustration. For example, consistent with description elsewhere herein, an embodiment may define multiple storage tiers including one tier of PDs based on a first type of flash-based PDs, such as based on SLC technology, and also including another different tier of PDs based on a second type of flash-based PDs, such as MLC. Generally, the SLC PDs may have a higher write endurance and speed than MLC PDs.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16*a*-16*n*. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25*b* may be used to facilitate data transfers and other communications between the device interfaces, HAs and/or RAs in a data storage array. In one embodiment, the device interfaces 23 may perform data operations using a cache (e.g., data cache) that may be included in the global memory 25*b*, for example, when communicating with other device interfaces and other components of the data storage array. The other portion 25*a* is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16*a*-16*n* of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

The device interface, such as a DA, performs I/O operations on a physical device or drive 16a-16n. In the following description, data residing on a LUN may be accessed by the device interface following a data request in connection with I/O operations that other directors originate. The DA which services the particular physical device may perform processing to either read data from, or write data to, the corresponding physical device location for an I/O operation. An I/O operation, such as to read or write data, may identify a logical device, such as a LUN, and an offset denoting a logical address or location on the LUN. Data storage at the LUN and offset may be stored at a physical storage location on one or more PDs. Thus, processing performed on the data storage system for the I/O operation may include mapping the LUN, offset to its corresponding physical storage location on one or more PDs of the data storage system.

In at least one embodiment in accordance with techniques herein, data read from, and/or data written to PDs denoting the backend non-volatile physical storage devices may utilize a data cache that is a form of fast memory, such as a form of solid state storage. The data cache, also sometimes referred to herein as a cache, may be implemented, for example, using a portion of global memory 25b as noted above. In connection with a read I/O operation, processing may include first determining whether the requested read data is stored in the cache thereby denoting a read cache hit. If there is a read cache hit, the requested read data may be retrieved from cache and returned to the requester without having to actually access the data on the PDs thereby greatly reducing the response time for the read I/O operation. If the requested read data is not in cache thereby denoting a read cache miss, the requested read data is read from its corresponding location on the one or more PDs, stored in the data cache, and then returned to the requester. In connection with a write I/O operation, the write data is first written to the cache in a cache location and marked as write pending (WP). Once the write data has been stored in cache, an acknowledgement regarding completion of the write operation may be returned to the requester even without actually writing the write data out to its corresponding location on the one or more PDs. At some time later, the WP data may be destaged from the cache to its location on the one or more PDs. Once the WP data has been destaged from cache, the cache location including the write data may be updated to clear the WP state, and more generally, the cache location may be reused.

Also shown in FIG. 1 is a management system 22a that may be used to manage and monitor the system 12. In one embodiment, the management system 22a may be a computer system which includes data storage system management software or application such as may execute in a web browser. A data storage system manager may, for example, view information about a current data storage configuration such as LUNs, storage pools, and the like, on a user interface (UI) in a display device of the management system 22a. Alternatively, and more generally, the management software may execute on any suitable processor in any suitable system. For example, the data storage system management software may execute on a processor of the data storage system 12.

Each of the different adapters, such as HA 21, DA or disk interface, RA, and the like, may be implemented as a hardware component including, for example, one or more processors, one or more forms of memory, and the like. Code may be stored in one or more of the memories of the component for performing processing.

An embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of FIG. 1 may be a data storage system, such as the VNXe® data storage system by EMC Corporation of Hopkinton, Mass., that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, memory 26 may represent memory of each such storage processor.

An embodiment of a data storage system in accordance with techniques herein may include one or more data facilities or services such as may be performed with respect to physical and/or logical data storage entities of the data storage system. For example, a LUN and a file are each a storage entity for which the data storage system may include one or more data replication facilities. For example, a snapshot facility may be a local data replication facility or service on the data storage system that may be used to create one or more snapshots of a file, file system, LUN, and the like. As known in the art, a snapshot technique used by a snapshot facility may be used to create a logical or virtual copy of the data source, such as a file or LUN. For example, a snapshot facility may be used in an embodiment in accordance with techniques herein to create a snapshot characterized as a logical point in time copy of data. In connection with a LUN or file, or more generally any storage entity, software of a data storage system may provide one or more data replication services or facilities whereby a snapshot is one such facility that may be used to create point in time snapshot of a data source such as a LUN. A snapshot may appear like a normal LUN and may be used for backup, testing, read operations, write operations, and the like. Snapshots may rely, for example, on copy on first write (COFW) and other techniques to track source LUN changes from the time when a snapshot was created. Any writes to the source may result in processing by snapshot software, for example, to copy the original data prior to changes into another area of storage. With respect to COFW techniques, the COFW occurs only once for each data block modified on the source. Since only changed data blocks of the source are retained rather than make a complete copy of the source, the storage capacity required to implement snapshots may be considerably less than that of the source. Though a snapshot of a source LUN may be presented to a user as a separate LUN along with the current source LUN, a snapshot of the source LUN is a virtual point in time copy and requires access to the unchanged data in the source LUN. Therefore failures affecting the source LUN also affect the snapshot of the source LUN. Snapshots of a source LUN may be contrasted, for example, with the physically complete bit-for-bit replicas of the source LUN.

In connection with the foregoing, COFW is only one example of a technology or technique that may be used in connection with snapshots. More generally, any suitable technique may be used in connection with snapshot creation and techniques described herein. As another example, redirect on Write (ROW) is another technique that may be used in connection with a snapshot implementation. With ROW, after a snapshot is taken, new writes to the primary source LUN are redirected (written) to a new location.

A data storage system may support one or more different types of logical devices presented to a host or other client as LUNs. For example, a data storage system may provide for configuration of thick or regular LUNs and also virtually provisioned or thin LUNs. A thick or regular LUN is a logical device that, when configured to have a total usable capacity such as presented to a user for storing data, has all the physical storage provisioned for the total usable capacity. In contrast, a thin or virtually provisioned LUN having a total usable capacity (e.g., a total logical capacity as published or presented to a user) is one where physical storage may be provisioned on demand, for example, as data is written to different portions of the LUN's logical address space. Thus, at any point in time, a thin or virtually provisioned LUN having a total usable capacity may not have an amount of physical storage provisioned for the total usable capacity. The granularity or the amount of storage provisioned at a time for virtually provisioned LUN may vary with embodiment. In one embodiment, physical storage may be allocated, such as a single allocation unit of storage, the first time there is a write to a particular target logical address (e.g., LUN and location or offset on the LUN). The single allocation unit of physical storage may be larger than the size of the amount of data written and the single allocation unit of physical storage is then mapped to a corresponding portion of the logical address range of a LUN. The corresponding portion of the logical address range includes the target logical address. Thus, at any point in time, not all portions of the logical address space of a virtually provisioned device may be associated or mapped to allocated physical storage depending on which logical addresses of the virtually provisioned LUN have been written to at a point in time.

In at least one embodiment, thin or virtually provisioned LUNs may be implemented with and organized as a type of mapped LUN. In such an embodiment, each thin LUN may be implemented as a file of a file system such as described, for example, in U.S. Pat. No. 9,367,395, Issued, Jun. 14, 2016, MANAGING DATA INCONSISTENCIES IN STORAGE SYSTEMS, Bono, et al., which is incorporated by reference herein. Following examples make reference to a thin LUN in connection with illustrating techniques herein. However, it will be appreciated by those of ordinary skill in the art that techniques herein are not limited to use with thin LUNs and may more generally be used in connection with other types of LUNs.

Figure 2:
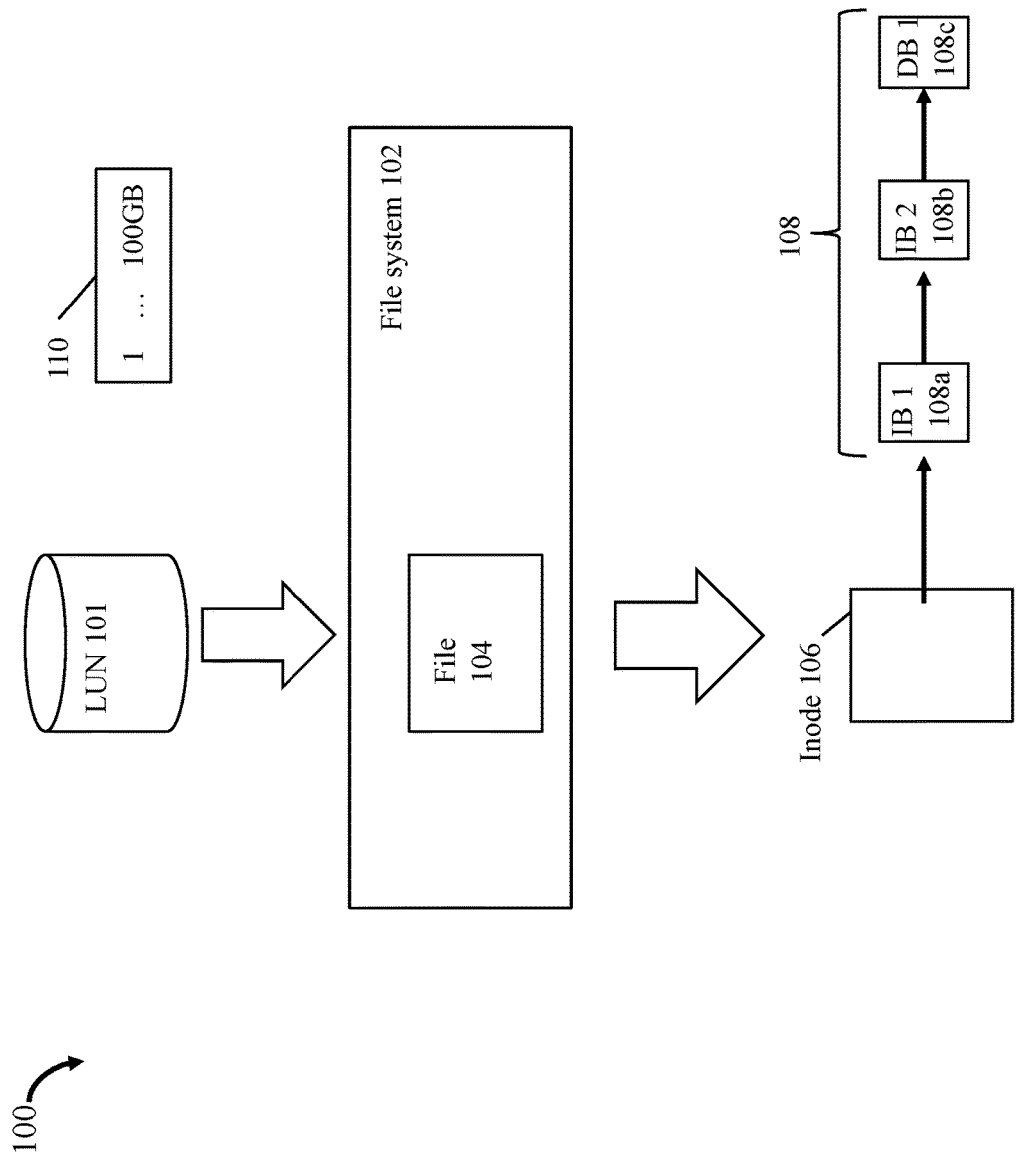
FIG. 2 is an example illustrating a thin or virtually provisioned LUN that may be implemented using a file in an embodiment in accordance with techniques herein.

Referring to FIG. 2, shown is an example 100 illustrating a thin LUN 101 that may be used in connection with an embodiment in accordance with techniques herein The example 100 includes LUN 101 implemented as file 104 on file system 102. The LUN 101 is a 100 GB capacity thin or virtually provisioned LUN having a logical address space as denoted by 110. In at least one embodiment, the 100 GB LUN 101 may be implemented using file 104 whereby the file 104 is a 100 GB file. In this manner, a relative file offset in 104 corresponds to a logical address or offset in the logical address space 110 of the LUN 101. Consistent with discussion elsewhere herein, physical storage for the thin LUN may be allocated in 8 kilobyte (KB) blocks in an on-demand manner. For example, the first time there is a write to a target logical address of the thin LUN's logical address space, the physical storage for the target logical address may be allocated and mapped to the thin LUN's logical address space. For example, a block of physical storage (at which the write data is stored) may be mapped to a particular block of the LUN's logical address space.

In at least one embodiment in accordance with techniques herein, file system 102 may be a UNIX-style file system. In such a file system, an index node (inode) is a data structure used to represent a filesystem object, such as a directory or file 104. In connection with thin LUN 101 implemented as file 104, the inode 106 for the file 104 stores various file attributes and a mapping structure 108 identifying the data block location(s) of the thin LUN. The data block locations may denote the allocated physical storage blocks for the thin LUN.

Generally, the inode 106 contains file metadata such as, for example, the size of the file, date of last modification, ownership, permissions, and the like. There is one inode for each file in the file system 102. Additionally, each inode such as inode 106 may be uniquely identified in the file system 102 by an inode number. The inode structure 106 also includes a tree structure 108, more generally referred to as a mapping structure 108. The structure 108 may include indirect blocks (IBs) which ultimately identify the data blocks (DBs) (e.g., physical storage locations) including the thin LUN data or contents. In 108, elements 108a-b denote IBs used to map to a single DB 108c that may correspond to a single block of the LUN 101 and its file 104. More generally, the structure 108 may include similar mappings between IBs and other DBs as physical storage is allocated for the thin LUN 101. The structure 108 may be characterized in one aspect as an address map that converts a logical address of the file (and thus of thin LUN 101) to a physical address (DB) of the file. It should be noted that an IB such as 108a-b may be an IB pointer that points to an indirect block that contains an array of block pointers (to either other IBs or to DBs). There may be many levels of IBs arranged in a hierarchy depending upon the size of a file where each level of IBs includes pointers to IBs at the next lower level. IBs may be considered metadata blocks in contrast to DBs which are data blocks.

In connection with the thin LUN 101 in at least one embodiment, the first time there is a write to a logical block address (LBA) of the LUN's logical address space 110, there is no existing data block or physical storage mapped to the LBA. As a result, in response to the first write to the LBA, physical storage in the form of a data block may be allocated and mapped to the LUN's logical address space. In this manner, the IBs and DBs of the tree structure 108 are also created in a dynamic manner as storage is allocated responsive to first writes to LBAs in the logical address space 110 of the thin LUN 101.

Referring to FIG. 3, shown is an example of a logical address space of a file system, such as file system 102 of FIG. 2, in an embodiment in accordance with techniques herein. The example 200 illustrates that the file system address space, such as of file system 102, may include address space mapped to DBs 202, IBs 204, inodes 206, and other metadata (MD) 208 used by the file system. Generally with reference back to FIG. 2, when thin LUN 101 is created, inode 106 may be allocated from the file system 102's address space portion 206. One or more writes to LUN 101 result in creating a portion of the tree or mapping structure 108 including allocated DBs from 202 and IBs from 204.

In at least one embodiment, space for the file system 102 may be provisioned in physical storage portions referred to as slices which are then mapped into the address space 200 of the file system 102. The file system 102 may then allocate blocks of storage for DBs, IBs, inodes, and other MD as needed. Physical storage for the file system may be provisioned in slices of storage from one or more RAID (redundant array of inexpensive disks) groups. A RAID group may be characterized as a logical storage entity defined from a group of physical storage devices, such as rotating disk drives, flash-based storage devices or other forms of non-volatile back end data storage devices. Physical devices of a RAID group are logically bound together to represent contiguous data storage space for applications. A RAID group represent a logically contiguous address space distributed across a set of physical storage devices of the group. Each physical storage device is subdivided into pieces used to spread the address space of the RAID group across the group (along with parity information if applicable to the RAID level). The physically contiguous pieces of the physical storage devices that are joined together to create the logically contiguous address space of the RAID group are called stripes. Stripes may form blocks and blocks may be allocated to create logical representations of storage space for use by applications within a data storage system. Each slice may denote an amount of storage, such as 256 MB (megabytes) although any suitable size may be used.

Figure 4:
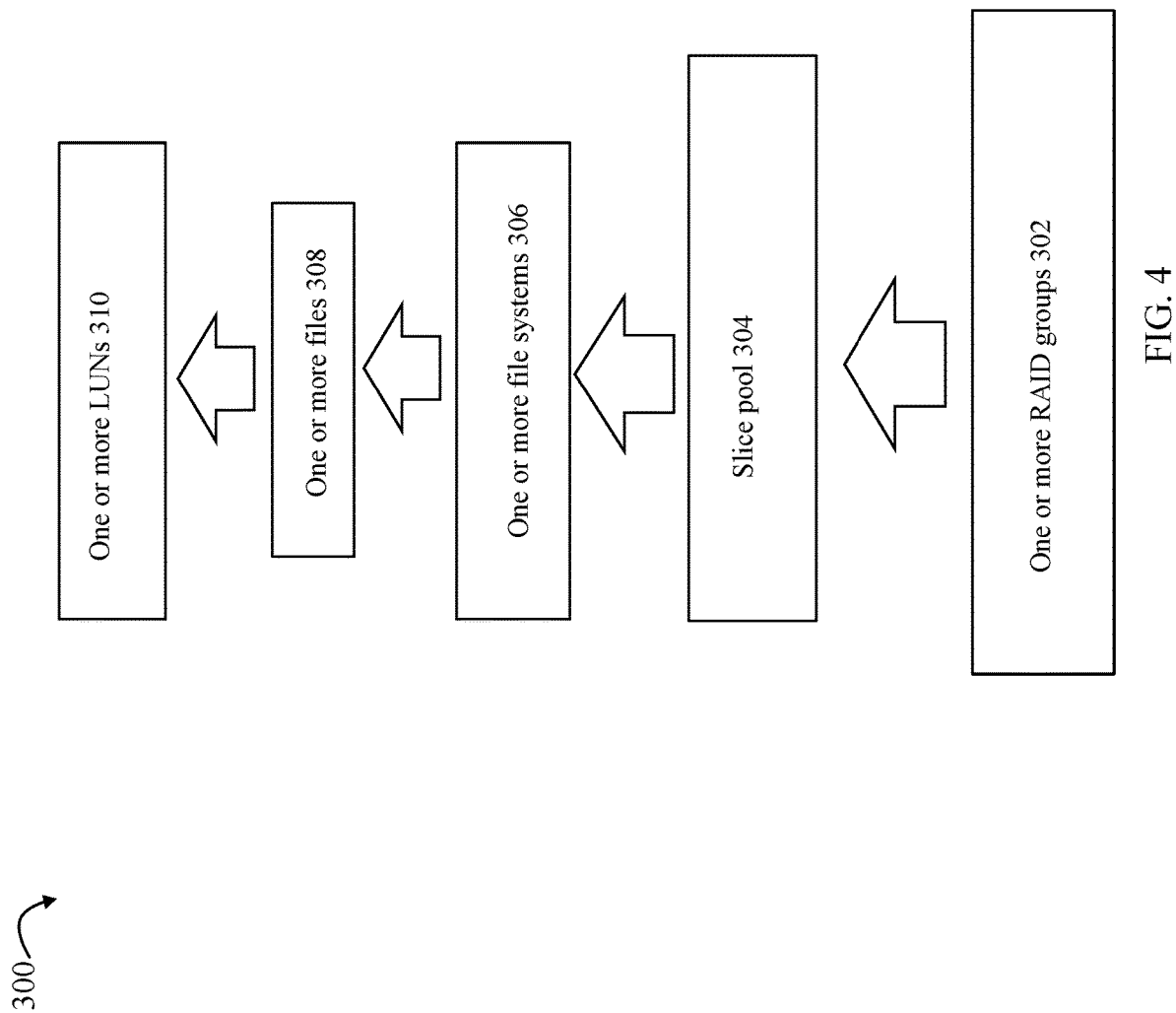
FIGS. 4 and 5 are example representations of different layers that may be used in implementing a LUN and its snapshot in an embodiment in accordance with techniques herein.

Referring to FIG. 4, shown is an example representing generally how storage may be configured for use with techniques herein. Element 302 denotes the one or more RAID groups as described above providing the physical storage from which slices of storage are allocated and included in slice pool 304. Slices from slice pool 304 may then be generally mapped, using possibly one or more other logical layers, into one or more file systems 306, such as file system 102 of FIG. 1. In each of the file systems of 306, one or more files 308 may be created to implement one or more corresponding LUNs 310. Consistent with other discussion herein, each file of 308 (e.g., 104 of FIG. 2) may implement a single corresponding LUN (e.g., LUN 101). U.S. Pat. No. 9,367,395, which is incorporated by reference herein, describes additional detail regarding how an embodiment may implement the layers of FIG. 4 and other aspects of techniques in an embodiment.

With reference back to FIG. 3, generally, in typical file systems, inodes, which include the metadata for a file, are stored alongside the data that comprises the content of the file in a physical storage media (e.g. disks) in a data storage system. As such, physical storage devices store both the user or file data itself and the file system metadata that is related to it. Further, each file system block of a file of a file system is associated with a per block metadata (also referred to herein as "BMD") that stores metadata (e.g., attributes related to sharing, checksum and the like) for that particular file system block and maintains information regarding the particular file system block. For example, the BMD for a DB may include the inode number of the file for the LUN having its data stored on the DB. The BMD for an allocated DB may identify the logical offset in the file for the LUN where the logical DB has been allocated for the logical offset.

In the example 200 of FIG. 3, the other MD 208 of the file system may include the BMD structures allocated and used by the file system. A different BMD is associated with each file system block, such as each IB and each DB. Additionally, the other MD 208 of the file system may also include one or more allocation bitmaps denoting which blocks of storage provisioned for the file system are allocated and which are unallocated (e.g., free or available for use by the file system). Each of the allocation bitmaps, also referred to as a cylinder group (CG), may be a bitmap for a logically contiguous sequence of physical storage blocks. A single CG may denote, for example, a logically contiguous sequence of physical storage blocks having a corresponding logically contiguous address space of a RAID group (e.g., such as may be included in a stripe of a RAID group). Thus, generally, blocks of physical storage mapped to the logically contiguous address space of a RAID group as included in 302 may be mapped to one or more CGs. In this manner, each block of physical storage that may be allocated or used by the file system 102 may have a corresponding bit in one of the CGs, or more generally, in an allocation bitmap. Each bit in the allocation bitmap may denote whether the associated physical storage block is currently allocated (e.g., bit=1) or is otherwise free and available for allocation (e.g., bit=0). Thus, the logically contiguous sequence of physical storage blocks may denote a sequence of logical addresses where the sequence denotes an order in which data may be written and stored on physical storage devices of the RAID group.

Logging may be performed in connection with many applications. For example, logging may be performed for file system operations of the file system 102 of FIG. 2 where the file system includes files used to implement LUNs as noted above and elsewhere herein. Thus, such logging may be used to log operations performed with respect to a file used to implement the LUN. In such an embodiment, a file operation that is recorded in a log for the file system may thus correspond, for example, to different operations performed on the LUN (e.g., operation performed with respect to the LUN is mapped to/corresponds to one or more logged file operations with respect to the file of the system used to implement the LUN). Logging may include logging a transaction or complex operation performed with respect to the LUN and its corresponding file of the file system. The transaction or complex operation may include performing one or more sub-steps or sub-operations to complete the transaction or complex operation. For example, the transaction or complex operation recorded in the log may be an operation such as to create a file in a file system corresponding to an operation to create a thin LUN, create a snapshot of an existing thin LUN, write to a thin LUN, write to a snapshot of a thin LUN, and the like. In at least one embodiment, an entry may be created in the data log, for example, for each of the foregoing operations issued, where each entry may denote a corresponding file/file system operation to accomplish the requested operation on the LUN or its snapshot. One logging approach is to write a log record recording the particular operation to be performed prior to actually performing the logged operation. Upon the occurrence of a system failure (e.g., power failure) or other event occurrence that may cause the logged operation to fail or not complete, the log can be replayed as part of recovery processing to make sure the logged operation and associated changes were actually completed.

Logging may also allow for faster acknowledgement to be returned to the requester of the logged operation that the logged operation has completed. For example, one embodiment may log a requested operation and return such acknowledgement to the requester even though processing for the requested operation may not have yet completed.

In at least one embodiment, data logging may be performed for a file system used to implement LUNs as described herein (e.g., such as illustrated in FIG. 2). Such a data log may be used to log file and file system operations. The file system enabled for data logging may also be referred to herein as a persistent file data cache (PFDC) enabled file system. Thus, the data log (or simply log) used to record the operations may also be referred to as a PFDC where logged operations may be stored persistently to non-volatile physical storage. In at least one embodiment, the data log itself may be stored on a logical device, such as LUN, at a logical address, offset or location on the LUN having its physical storage provisioned on non-volatile physical storage (e.g., one or more PDs) whereby writes to the data log may be persistently stored as described elsewhere herein (e.g., write data is stored in the data cache as WP data, and then destaged/written out to non-volatile physical storage at a later point in time).

Figure 5:
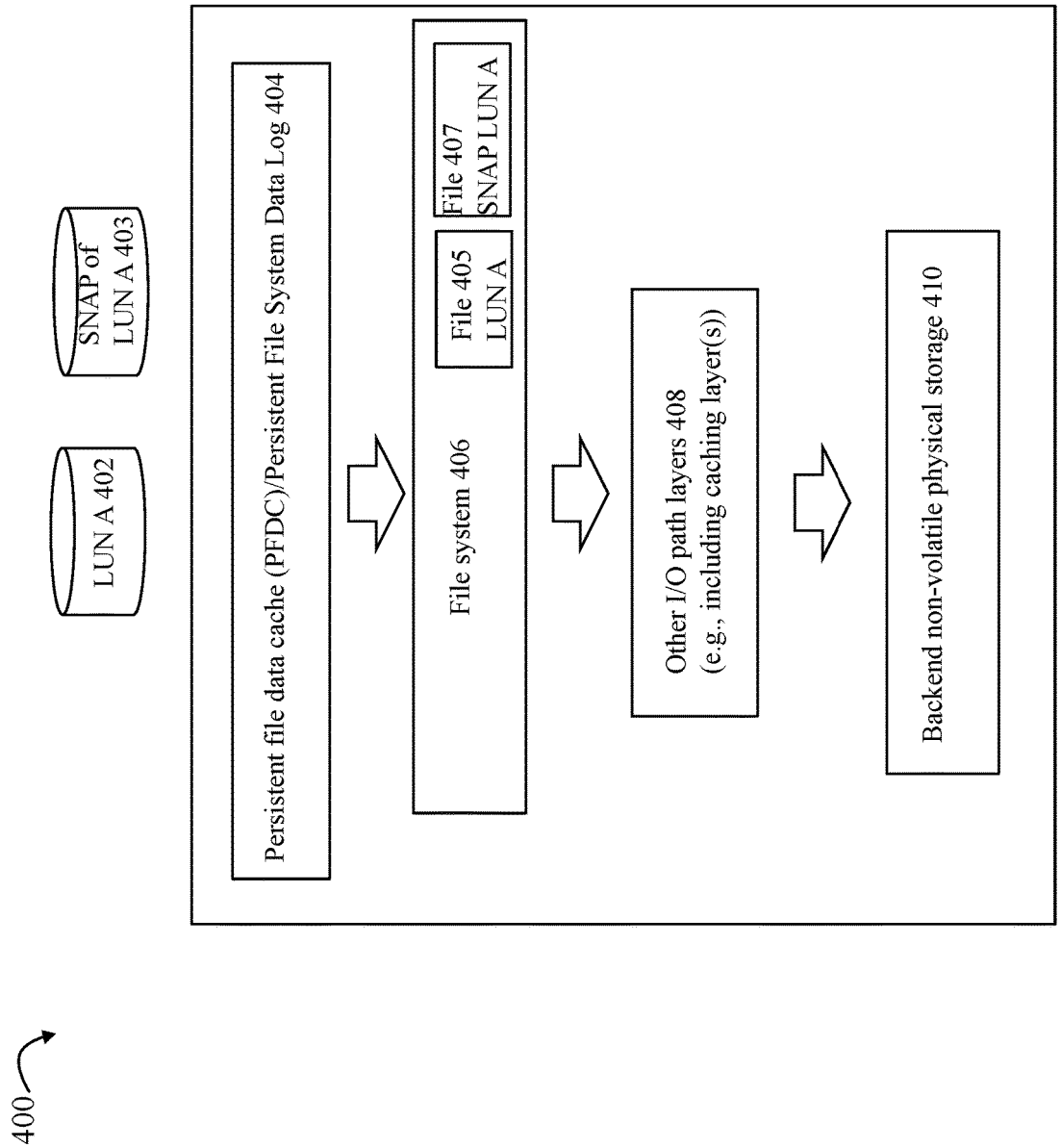

Additionally, the operations of the file system may be recorded in the data log with the intention of improving performance where the logged operation once recorded may actually be performed or implemented as a later point in time subsequent to its recording. In this manner the PDFC or data log for the file system operations may be included in the I/O path such as illustrated in FIG. 5. In the example 400 of FIG. 5, the I/O path for an I/O, such as a write operation, issued to thin LUN A 402 implemented using file system 406 may include multiple layers. In at least one embodiment, the I/O path for the write operation may include the PFDC 404 (denoting the persistent file system data log 404 for the file system 406), the file system 406, and one or more other I/O path layers 408 where the write data of the write operation is then written out to the backend non-volatile physical storage 410. The other I/O path layers 408 may include, for example, one or more caching layers such as the multi-core cache (MCC) layer, multi-core fast cache (MCF) layer and multi-core RAID cache (MCR) layer such described in U.S. Pat. No. 9,367,395, which is incorporated by reference herein and also noted elsewhere herein. In at least one embodiment, the write I/O may have an I/O path as denoted generally in FIG. 5 where the write I/O operation may write data to a logical offset or location of a thin LUN A 402 implemented as file 405 in file system 406. The write I/O may be logged in the PDFC 404. At a later point in time, the logged write I/O may be flushed from the PDFC 404 to the file system 406, through the other lower layers 408, and then to backend non-volatile physical storage 410. The write to the LUN A 402 may be to a target location denoting a logical address, offset or location in the LUN A 402. The log entry, corresponding to the logged write I/O as stored in the PFDC 404, may include a descriptor describing the logged write I/O. The descriptor in the PFDC 404 for the logged write I/O may, for example, identify the file 405 (used to implement the LUN A 402), the target location (of where the data is to be written in the file 405), the write data (or pointer thereto), and the like. At a later point in time, the logged entry in the PFDC 404 for the write I/O is flushed from the PFDC 404.

In a similar manner, more generally, any file or file system operation performed with respect to file system 406 may be logged in the PFDC 404 by creating a corresponding entry and descriptor including information on the logged operation. Such operations may include file system/file operations for the file system 406. For example, such operations corresponding to various operations performed with respect to a LUN having a corresponding file in the file system 406 such as creating a new LUN (e.g., creating a new file in the file system 406 where the new file implements the new LUN), deleting an existing LUN (e.g., deleting an existing file in the file system 406 where the existing file implements the existing LUN), performing a write to an existing LUN (e.g., writing to an existing file in the file system 406 where the existing file implements the existing LUN being written to), creating a snapshot (SNAP) of a LUN (e.g., creating a new file denoting the SNAP of the LUN), performing a write to an existing SNAP of a LUN (e.g., writing to an existing file in the file system 406 where the existing file implements the existing SNAP of a LUN being written to), deleting an existing SNAP of a LUN (e.g., deleting an existing file denoting the SNAP of the LUN), and the like. In this manner, operations such as the foregoing performed with respect to a LUN (e.g., such as LUN 402) may be implemented as file system operations performed with respect to files in the file system 406.

In at least one embodiment in accordance with techniques herein, a SNAP of the LUN A 402 (where the LUN 402 is implemented as file 405) may be implemented as the second file 407 of the file system 406. Element 403 may denote the SNAP of LUN A 402. In such an embodiment, the second file 407, denoting the SNAP 403 of LUN A, may share the data blocks of the file 405 (corresponding to the snapshot's data source, LUN 402). Consistent with discussion herein, a snapshot may be characterized as a logical point in time copy of a source. The create operation that creates the SNAP 403 of LUN A may include creating an inode for the file 407 where the inode for file 407 includes structures or pointers that map to the same set of data blocks as used for file 405 (for LUN A 402). In this manner, the file 407 may be characterized as a logical or virtual copy of the file 405, where both 405 and 407 may initially share the same set of data blocks storing data for the LUN A 402 (e.g., before any modifications are made to either LUN A 402 or its SNAP 403 once the SNAP 403 is created).

Figure 6:
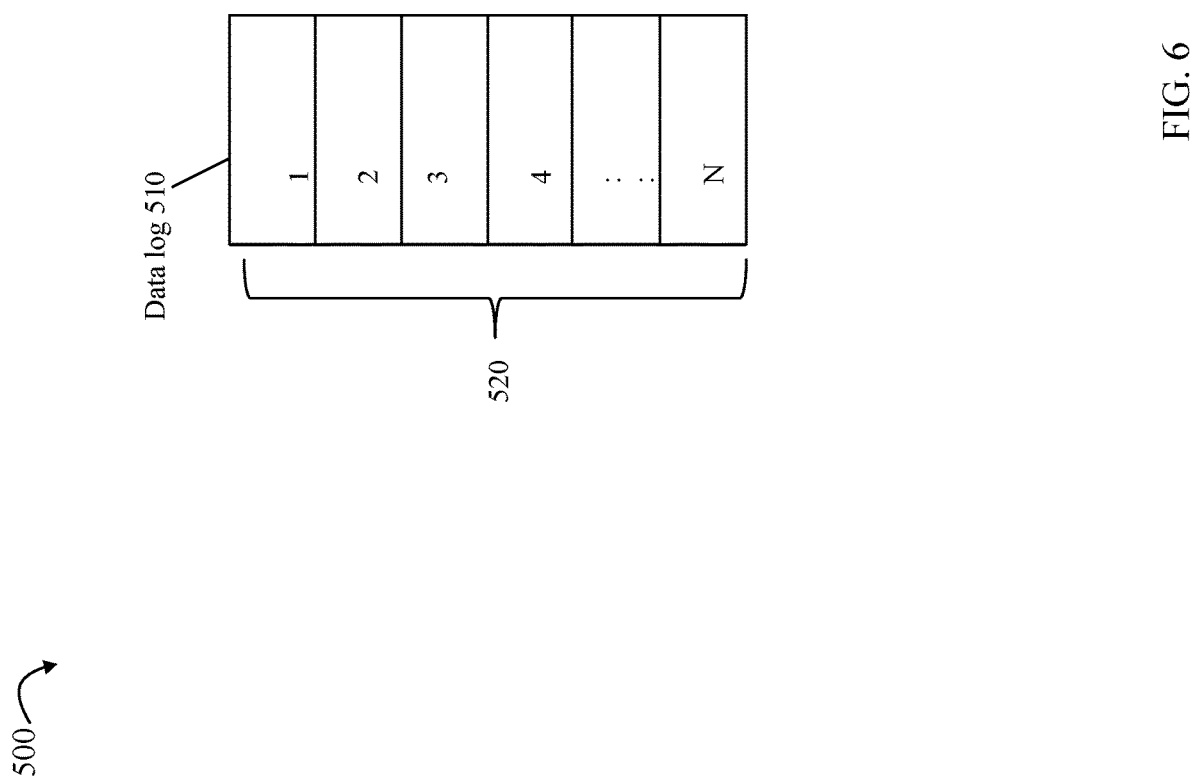
FIG. 6 is an example illustrating a representation of a data log in an embodiment in accordance with techniques herein.

Referring to FIG. 6, shown is an example of a data log that may be used in an embodiment in accordance with techniques herein. As described above, in an embodiment in accordance with techniques herein, processing may be performed to log operations of a file system, such as the file system 406 used to implement thin LUNs (e.g., element 402 of FIG. 5) on the data storage system. Such logged operations may be recorded in a data log illustrated in FIG. 6 where the data log may be the PFDC or persistent file system data log 404 of FIG. 5. In at least one embodiment, the data log 510 may be stored at a particular location or offset on a LUN having provisioned physical storage on physical storage devices (e.g., non-volatile backend PDs) of the data storage system. Thus, each log record may be stored at a logical location represented by a LUN and LBA or offset which is then further mapped to physical storage. In the example 500, the data log 510 includes N records 520. One of the N log records may be used to record logged information for each logged operation. A log record may include, for example, information, such as the descriptor noted above, identifying the one or more sub-steps or operations to be performed for the recorded transaction or complex operation. An embodiment may have a data log with an upper bound or maximum size N in order to ensure that the log does not grow indefinitely. Thus, N denotes the maximum number of transactions or operations that may be pending or in-flight at any point in time in this particular embodiment.

As with other files or data written to a LUN, as log records are written to the data log 510, such write data may be initially written to cache and then later destaged to non-volatile physical storage storing the log data. In connection with the file system having its file operations recorded in the data log 510, a log record of the data log 510 may be reused once the recorded operation in the log record has been completed. In one embodiment, processing may log operations in records beginning with the first record 1 of the data log 510 and continue sequentially until the end of the data log is reached at record N. Subsequently, processing may continue to log the next $N+1^{th}$ operation by again cycling through the log records 1 through N of the log file and record the $N+1^{th}$ operation in one of the N previously used log records if the recorded operation in the previously used log record has completed. It should be noted that in this particular example, if all N records of the log file are associated with transactions or operations that are still pending and an N+1th operation is received, the N+1th operation may not logged until one of the pending transactions or operations currently logged in one of the N records has completed.

In at least one embodiment, the data log 510 may be implemented as a circular log as generally described above where entries are made sequentially in the data log.

Figure 7:
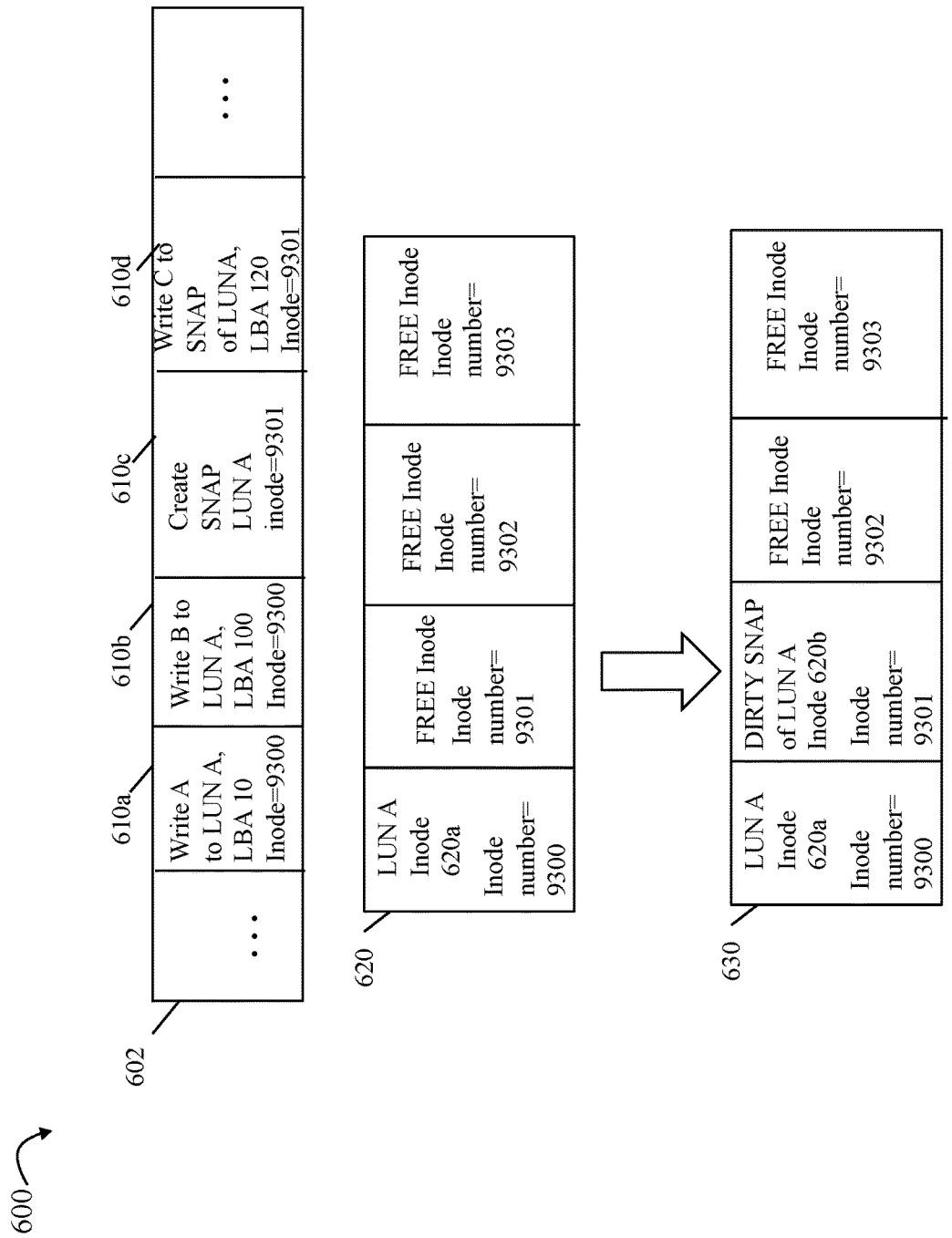
FIGS. 7, 8 and 9 are examples illustrating use of techniques in an embodiment in accordance with techniques herein.

Referring to FIG. 7, shown is an example 600 illustrating an inode space 620 and data log 602 with entries in an embodiment in accordance with techniques herein. The example 600 illustrates 4 entries 610a-d that may be recorded in the data log 602 of the PFDC 404 in an embodiment in accordance with techniques herein for the file system 406. Entries 610-d may be written to the data log 602 for 4 corresponding file operations performed at four different sequential points in time (e.g., entry 610a at first point in time A, entry 610b at second point in time B (following A), entry 610c at third point in time C (following B), and entry 610d at fourth point in time D (following C). Consistent with discussion herein, an operation may be recorded as an entry in the log 602 where the operation may not be implemented (or not completely implemented) until the log entry for the operation is flushed from the PFDC. In the following example with reference to data log 602 of FIG. 6, assume there is an existing LUN A 402 as illustrated in FIG. 5 but the SNAP of LUN A 403 has not yet been created.

A first write that writes data A to LUN A, LBA (logical block address or location) 10 is issued at a first point in time. The first write is recorded as entry 610a in the data log. The write data A of 610a is not actually written out to the file system 406, and thus the non-volatile physical storage 410, until entry 610a and entries corresponding to prior point in time operations, are flushed from the log 600.

Element 620 denotes inodes of the address space of file system 406 at the first point in time when the above-mentioned first write is issued whereby only inode 620a has been allocated for use with LUN A. At this first point in time, inodes 9301, 9302 and 9303 are all free. The entry 610a may identify the inode number of the file to which the write is directed. Thus, in this case, entry 610a includes inode number 9300 identifying inode 620a for the LUN A.

While 610a is still pending in the log 602, a second write is issued that writes data B to LUN A, LBA 100 at a second point in time. The second write is recorded as entry 610b in the data log. The write data B of 610b is not actually written out to the file system 406, and thus the non-volatile physical storage 410, until entry 610b and entries corresponding to prior point in time operations, are flushed from the log 602.

Element 620 also denotes inodes of the address space of file system 406 at the second point in time when the above-mentioned second write is issued whereby only inode 620a has been allocated for use with LUN A. At this second point in time, inodes 9301, 9302 and 9303 are all free. The entry 610b may identify the inode number of the file to which the write is directed. Thus, in this case, entry 610b includes inode number 9300 identifying inode 620a for the LUN A.

While 610a and 610b are pending in the log 602, a third operation is issued that creates a SNAP of LUN A at a third point in time. The third operation is issued to create the SNAP 403 of LUN A implemented as another file in the file system 406 as discussed above. The third operation is recorded as entry 610c in the data log. All processing steps to fully create the SNAP 403 of LUN A may not be performed until entry 610c, and entries corresponding to prior point in time operations, are flushed from the log 602. In connection with 610c, the SNAP 403 of LUN A created at the fourth point in time may not be created/implemented until any other writes to LUN A occurring prior to the fourth point in time have been performed, or more generally, have their corresponding entries flushed from the data log. In this particular example, the writes having entries 610a and 610b need to be flushed from the data log prior to actually completing processing to implement creation of the SNAP 403 of LUN A. In at least one embodiment, at the time the entry 610c is recorded in the log for the create snapshot third operation, processing performed may include allocating or reserving an inode for SNAP 403 of LUN A from the inode space 206. In at least one embodiment, there may be a limited number of inodes available for use in a file system address space Thus, when recording the create snapshot third operation in the log, processing may include ensuring one or more resources, such as an inode, needed for snapshot creation are available for use in connection with implementation of the third operation. However, the processing performed in connection with recording the create snapshot operation in the log does not complete all processing to fully create or implement the snapshot creation. Rather such processing performed when logging the create snapshot operation in 610c may be characterized as a first step that partially completes processing to create the snapshot. In at least one embodiment, such processing performed for the first step when recording in the data log the create snapshot operation includes reserving or allocating the inode for the snapshot without, for example, further initializing other inode metadata to establish the relationship with the data source, LUN A 402. Remaining processing to create the snapshot, including completing initialization of the inode metadata for SNAP 403 of LUN A, may be performed in a second step responsive to flushing the entry 610c from the log 602. Upon completing this second step for the snapshot creation, all processing for creating the snapshot SNAP 403 of LUN A is complete and the SNAP 403 is available and ready for use. For example the second step of creating the SNAP 403 may include establishing the relationship between the reserved inode for the SNAP 403 and the data source, LUN A (e.g., establish connection/relationship between reserved inode for SNAP 403 and the allocated data blocks for LUN A). In connection with creating the entry 610c to record the create SNAP LUN A operation, the inode of the allocated or reserved descriptor for the SNAP 403 of LUN A may be included in the entry's descriptor.

In this particular example 600, inode 9301 may be allocated or reserved for use with the file corresponding to the SNAP of LUN A for the above-noted third operation. The allocated or reserved inode is denoted by the inode number 9301 which is recorded in entry 610c. Element 630 denotes inodes of the address space of file system 406 after the allocation of inode 9301 for use with the third operation to create the SNAP of LUN A whereby inodes 620*a* and 620*b* (inode number 9301) have been allocated for use. Thus, element 630 denotes a revised or updated state (e.g., updated from the state of 620 to 630) of the inode space of the file system 406 after the operation to create SNAP of LUN A has been logged in entry 610*c*.

While 610*a-c* are pending in the log 602, a fourth operation is issued that writes data C to the SNAP of LUN A at LBA 120 at a fourth point in time. The fourth operation is recorded as entry 610*d* in the data log. The write data C of 610*d* is not actually written out to the file system 406, and thus the non-volatile physical storage 410, until entry 610*d* and entries corresponding to prior point in time operations, are flushed from the log 602. The entry 610*d* may identify the inode number of the file to which the write is directed. Thus, in this case, entry 610*d* includes inode number 9301 identifying inode 620*b* for the SNAP 403 of LUN A.

In connection with discussion herein, a "dirty" snapshot or dirty snap may denote a state of a snapshot and its allocated or reserved inode (e.g., dirty snap inode), where the inode for the snapshot has been allocated or reserved as in the first step for creating a snapshot denoted above with the third operation, the "create SNAP of LUN A" operation. However, in this dirty state, the inode (e.g., dirty inode or dirty snap inode) has only been allocated or reserved for use with the snapshot without further completing remaining processing, such as in connection with the second step of the snapshot creation processing noted above, to establish and complete implementation of the snapshot so that the snapshot, such as SNAP 403 of LUN A, is available for use.

Thus, in a consistent file system having a data log of the PFDC, the inode number stored in a data log entry may be used to identify the corresponding inode in the inode space of the file system. For example, each of the entries 610*a-d* as illustrated in FIG. 7 is consistent in that there is an established pairing between the entry and the inode of the file to which the recorded operation of the entry is directed. For example, entry 610*c* for the dirty snapshot 403 is well paired and thus consistent in that entry 610*c* includes a valid inode number 9301 which identifies an actual dirty snap inode 620*b* of the file system (e.g., where the inode 620*b* may be located in the file system address space and validated as having the indicated inode number 9301 and also validated as having an associated state denoting a dirty snapshot inode). Thus, in at least one embodiment, the inode number for the dirty snapshot operation may be stored in the data log. However, the dirty snapshot's inode, such as 620*b*, does not store any information (e.g., pointers to) any data log record(s) of 602 referencing the dirty snapshot inode. Thus, elements 602, 620 and 630 illustrate a consistent file system including a dirty snap inode 620*b* and dirty snap data log entries 610*c-d* where each of 610*c-d* validly reference the dirty snap inode number 9301. More generally, each of the entries 610*a-d* reference an inode number of a valid inode of the file system.

However, it may be possible for there to be a corruption to data of one or more inodes and/or data of one or more data log entries. Detection of a corrupted or missing dirty snapshot inode may be detected as an inconsistency in the file system 406 by examining the data log such as part of recovery processing in attempts to recover the file system and prevent or minimize data loss. However, additional extensive data loss may occur depending on the particular techniques utilized, for example, if there is a corruption or missing data of the data log of the PFDC. For example, a file system check utility (FSCK) may perform processing that detects one or more file system inconsistencies and then may attempts to recover the file system using the data log of the PFDC. In a case where the FSCK utility is unable to recover a file, a user may lose data thereby causing a data loss or unavailability. Described in following paragraphs are techniques which provide for a two phase data log recovery approach. In at least one existing implementation not using the two phase data log recovery approach described herein, a one phase data log recovery approach may be utilized which may result in larger data losses in the event of data log corruption when compared to the two phase data log recovery approach using techniques herein.

When a dirty snapshot inode in inode space has been corrupted, such as inode 620*b* having inode number 9301, but there is no corruption to the data log entries, an inconsistency may be determined by examining entry 610*c* referencing inode number 9301 and determining if the entry 610*c* is well paired with a valid but dirty snapshot inode having inode number 9301. In other words, processing may first attempt to locate an inode (such as 620*b*) in the file system address space 630 having inode 9301. Further, the inode 620*b* having inode number 9301 may be examined to determine that it has a corresponding initialization state corresponding to that of a dirty snapshot (e.g., where the metadata of the inode may not be initialized, for example, where there is no relationship or connection to a data source such as LUN A). If no such inode 620*b* with inode number 9301 can be located, or if located, does not have a state corresponding to that of a dirty snapshot inode, an inconsistency may be determined. However, if there is a corruption or missing data log entry for a dirty snapshot, use of the one phase data log recovery in an implementation not using techniques herein may not be able to determine the precise cause of the inconsistency and thus may not be able to return the file system (e.g., data log and inodes) to a consistent state (e.g., where such inconsistency may be due to missing or corrupted dirty snap inodes and/or missing or corrupted data log entries for snapshot operations (e.g., snapshot creation and/or writes to a snapshot). In such an existing implementation not using techniques herein, guaranteeing that the file system may be returned to a consistent state by recovery processing may result in losing/removing all data log entries that create a dirty snapshot, all dirty snapshot inodes, and losing/removing all data log entries that point to or reference a dirty snapshot inode, thereby resulting in potentially a large amount of data loss even in cases where such data may not actually be corrupted.

In order to further reduce or minimize data loss, the two phase data log recovery techniques described in following paragraphs may be utilized. Such techniques may be used to provide for protecting and/or minimizing data loss such as with respect to, non-corrupted dirty snapshot inodes, non-corrupted data log entries creating snapshots and thereby having an associated dirty snapshot inode, and non-corrupted data log entries performing I/Os such as writes to dirty snapshots. Thus, the two phase data log recovery processing described in following paragraphs provides protection of non-corrupted data by removing only corrupted or invalid data thereby minimizing or reducing data loss in comparison to other existing techniques which may make overly general or broad assumptions regarding what data is corrupted in order to guarantee the file system is returned to a consistent state after recovery processing.

The first phase, PHASE I, of techniques herein may include a step A. In step A, processing may include traversing the data log and examining each entry's descriptor that references an inode number to validate that the inode number of the entry/descriptor refers to an actual valid inode of the file system. For example, the inode number of an entry in the data log is obtained and used to locate an inode in the file system's address space (e.g. where the inode has a state indicating the inode is in use/has been allocated/is not free). If the inode number has not been validated/is determined as invalid, the entry/descriptor in the data log may be cleared, initialized or zeroed out to thereby indicate the entry's descriptor is invalid/not to be used.

PHASE I of techniques herein may also include a step B (which may be performed following step A). In step B, processing may be performed to generally determine whether there is a missing or corrupt data log entry for a create snapshot operation. Step B may include traversing the data log and searching for all entries logging a corresponding create SNAP operation. For each create SNAP operation having a corresponding entry in the data log, obtain the inode number included in the entry. The inode number is supposed to identify a dirty snapshot inode thus step B includes performing processing to validate the inode number of the logged create SNAP operation. Such validation processing includes attempting to locate a corresponding inode in the file system where the corresponding inode matches the inode number of the log entry for the create SNAP operation. Furthermore, processing validation processing of step B may include examining the state of the matching inode to ensure that the inode's state corresponds to that of a dirty snapshot inode (e.g., metadata of the inode has not been initialized whereby, for example, there is no relationship to a data source, no tree structure or mapping structure (e.g., 108 of FIG. 2) in the dirty snapshot inode. For each entry in the data log for which a match is determined between the entry in the log for a create snapshot operation and its dirty snapshot inode, the dirty snapshot inode is marked as "snap validated" (to denote the matching and validated correspondence/consistency between the entry of the create snapshot operation and its dirty snapshot inode that has been allocated).

The second phase, PHASE 2, of techniques herein may include a step C. In step C, the inode list for the file system may be traversed to ensure that every dirty snapshot inode has been marked as "snap validated". If an inode is for a dirty snapshot/is a dirty snapshot inode (e.g., as may be determined based on state of inode) and is not marked as "snap validated", the dirty snapshot inode may be cleared or removed thereby changing the dirty snapshot inode state to free or available for use. It should be noted that if step C determines that a dirty snapshot inode was not marked as "snap validated" by step B, it means the corresponding data log entry for the create snapshot command has been lost or corrupted.

Following performing step C of PHASE 2, step D of PHASE 2 may be performed. Step D may include traversing the data log and removing entries for I/O operations, such as writes, to a dirty snapshot which now reference an invalid dirty snap inode which has been cleared or removed in step C of PHASE 2. In other words, this step D performs processing that removes any entry from the data log that denotes an I/O such as a write where the entry includes references a dirty snapshot inode that has been cleared, removed or otherwise indicated as free as a result of processing performed in step C of PHASE 2 described above.

Following step D of PHASE 2, step E may be performed as part of clean up processing. Step E may include, for example, clearing the inodes previously marked as "snap validated" in PHASE 1 processing described above.

The foregoing processing steps may be included as processing performed in connection with recovery processing in an embodiment in accordance with techniques herein. Such recovery processing as described above may be performed responsive to determining a file system inconsistency. In at least one embodiment, the file system inconsistency may be determined by a utility known in the art, such as FSCK mentioned above. The above-noted recovery processing steps of the two phase data log recovery, or more generally two phase recovery processing, may be used to establish a consistent file system state with a data log that can then be flushed.

To further illustrate use of the two phase recovery processing described above, reference is made below to an example illustrated in connection with FIGS. 8 and 9. The following example is generally a variation of the prior example described above in connection with FIG. 7. In FIG. 7 as described above, the file system state illustrated in the example 600 is consistent. Consistent with other discussion herein, a consistent file system generally has consistent and valid correspondence between data log entries for the file system operations and inodes of the file system. More specifically, in a consistent file system, conditions including the following are true:

1. Each operation, such as a write operation, having an entry in the data log refers to a valid inode in the file system. The inode may be determined as having a valid state, for example, based on the information and state of the inode (e.g., the metadata of inode structure, the inode having an allocated state as may be denoted by one or more flags, and the like).

2. Each dirty snapshot inode for a snapshot of a file in the file system has a corresponding entry in the data log for an operation that creates the snapshot.

3. Each entry in the data log for an operation that creates a snapshot of a file in the file system has a corresponding dirty snapshot inode for the snapshot. The inode may be determined as being a dirty snapshot inode, for example, based on the information and state of the inode (e.g., the metadata of inode structure not being initialized, the inode having an allocated state as may be denoted by one or more flags, the inode not having a mapping structure 108, and the like).

It should be noted that the above-noted conditions regarding file system consistencies are only a portion of the conditions or properties generally known in the art that characterize a consistent file system.

Figure 8:
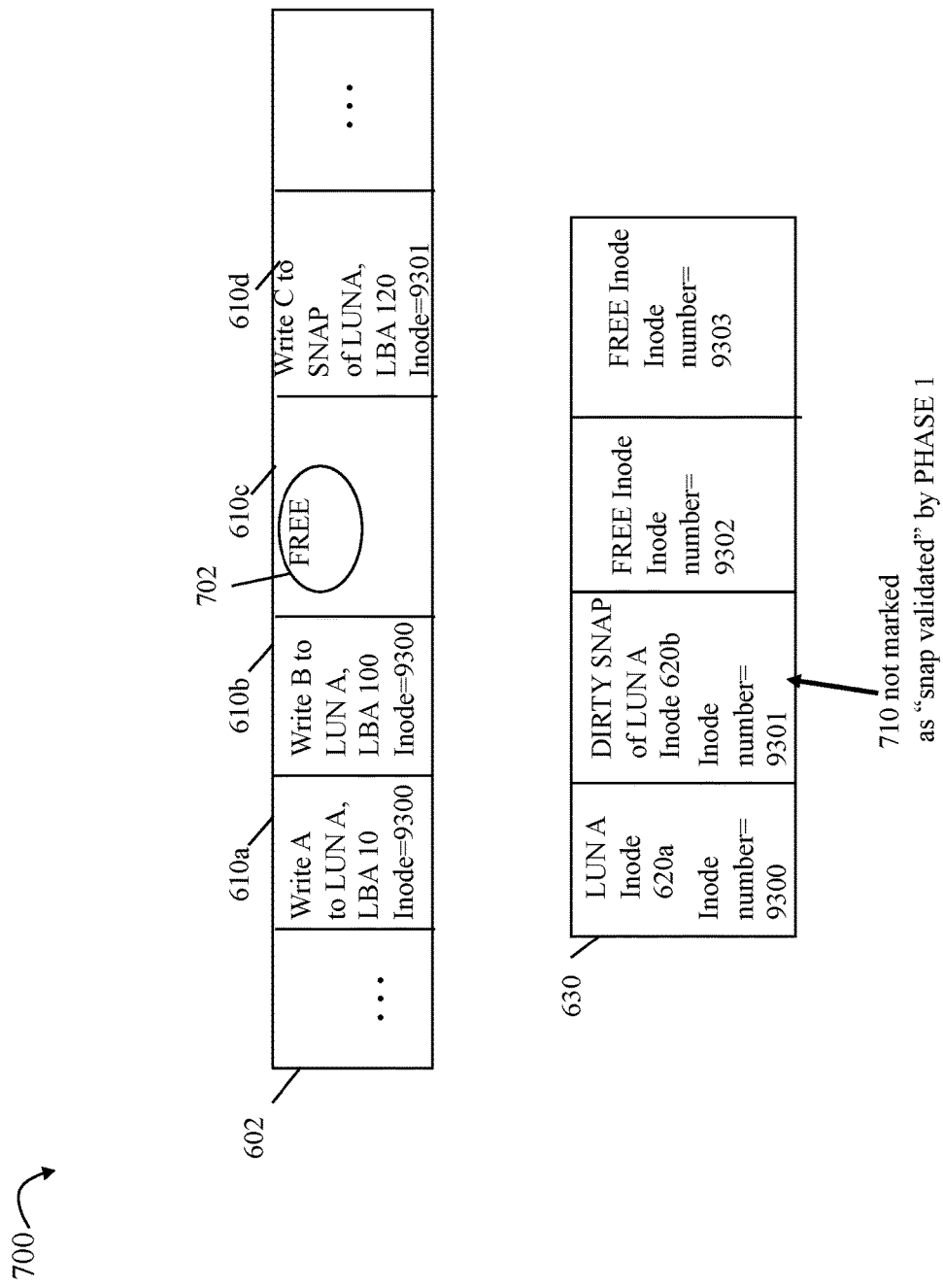

In connection with the example 700 illustrated in FIG. 8, assume the create SNAP LUN A entry 610c has been corrupted so that entry 610c is denoted as FREE 702 (rather than as illustrated in FIG. 7). PHASE 1 processing of techniques herein may result in 710 not marking inode 620b as "snap validated". (If entry 610c was uncorrupted and as in FIG. 7, PHASE 1 processing using techniques herein would have marked inode 620 as "snap validated".) Thus, FIG. 8 denotes the result of PHASE 1 processing using techniques as described herein for this particular example.

Figure 9:
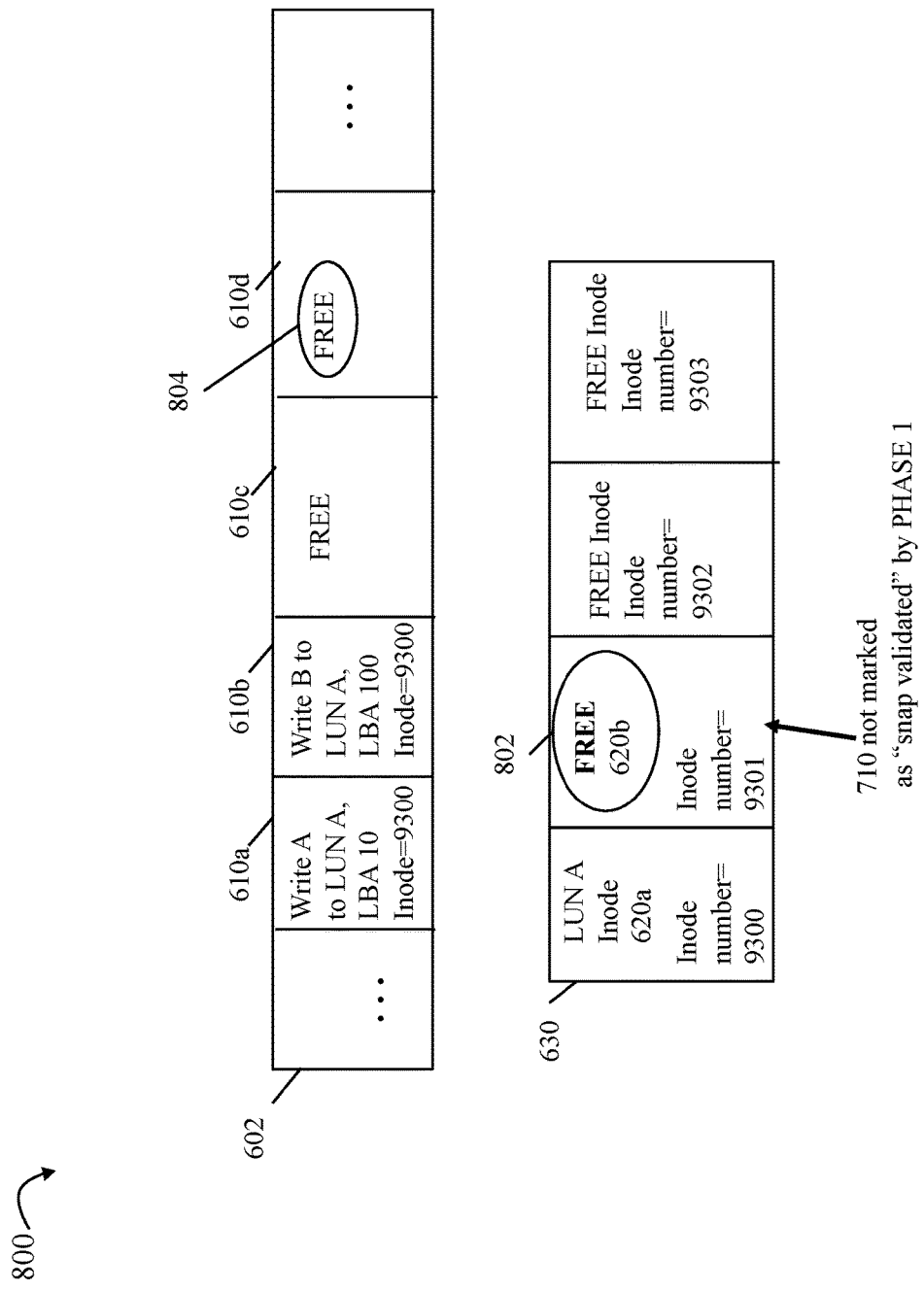

Referring to FIG. 9, shown is an illustration of the result of processing of PHASE 2 in an embodiment in accordance with techniques herein. Continuing with the example 700 of FIG. 8, PHASE 2 processing may be performed. In PHASE 2, step C results in updating the state of inode 620b (inode number 9301) to a state of FREE (as denoted by 802). Additionally, PHASE 2 step D results in clearing of freeing the data log entry 610d (as denoted by 804, entry 610d is cleared/freed since it recorded an I/O operation referencing inode number 9301, and the inode 620b having inode number 9301 was cleared/freed in step C of PHASE 2 processing.

Figure 10:
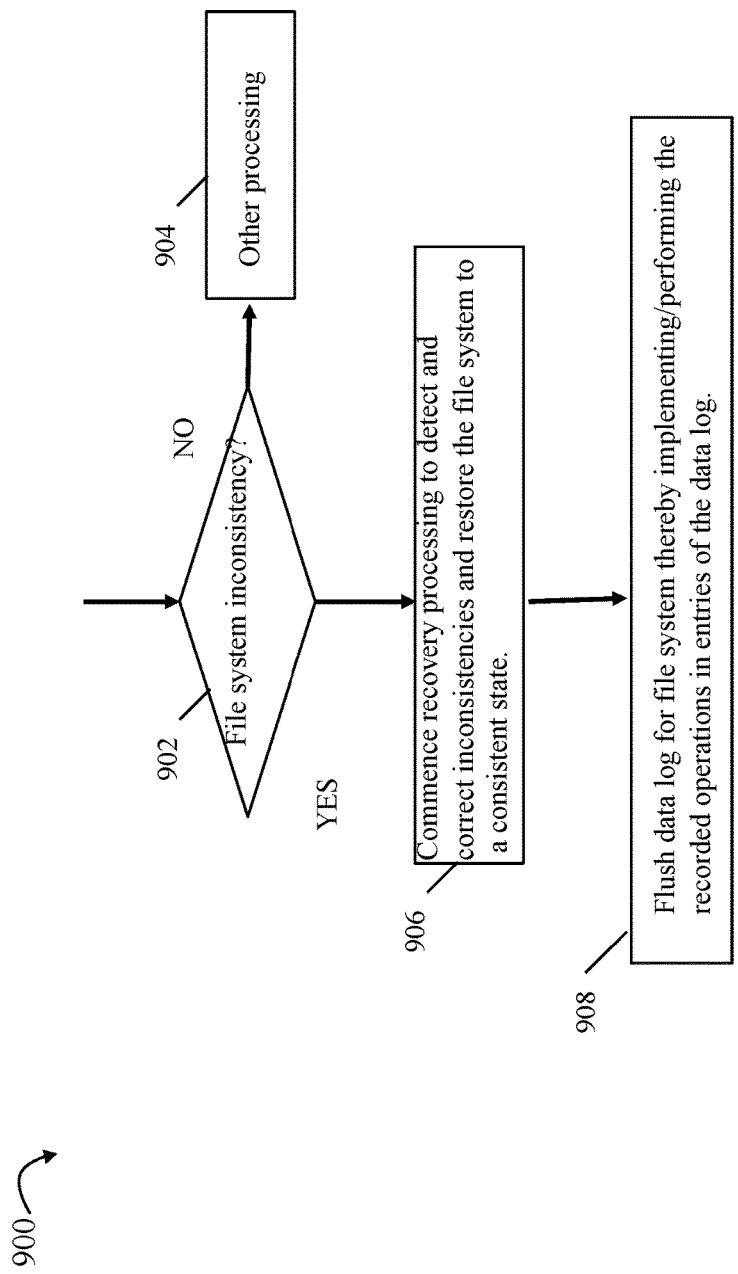
FIGS. 10 and 11 are flowcharts of processing steps that may be performed in an embodiment in accordance with techniques herein.
Figure 11:
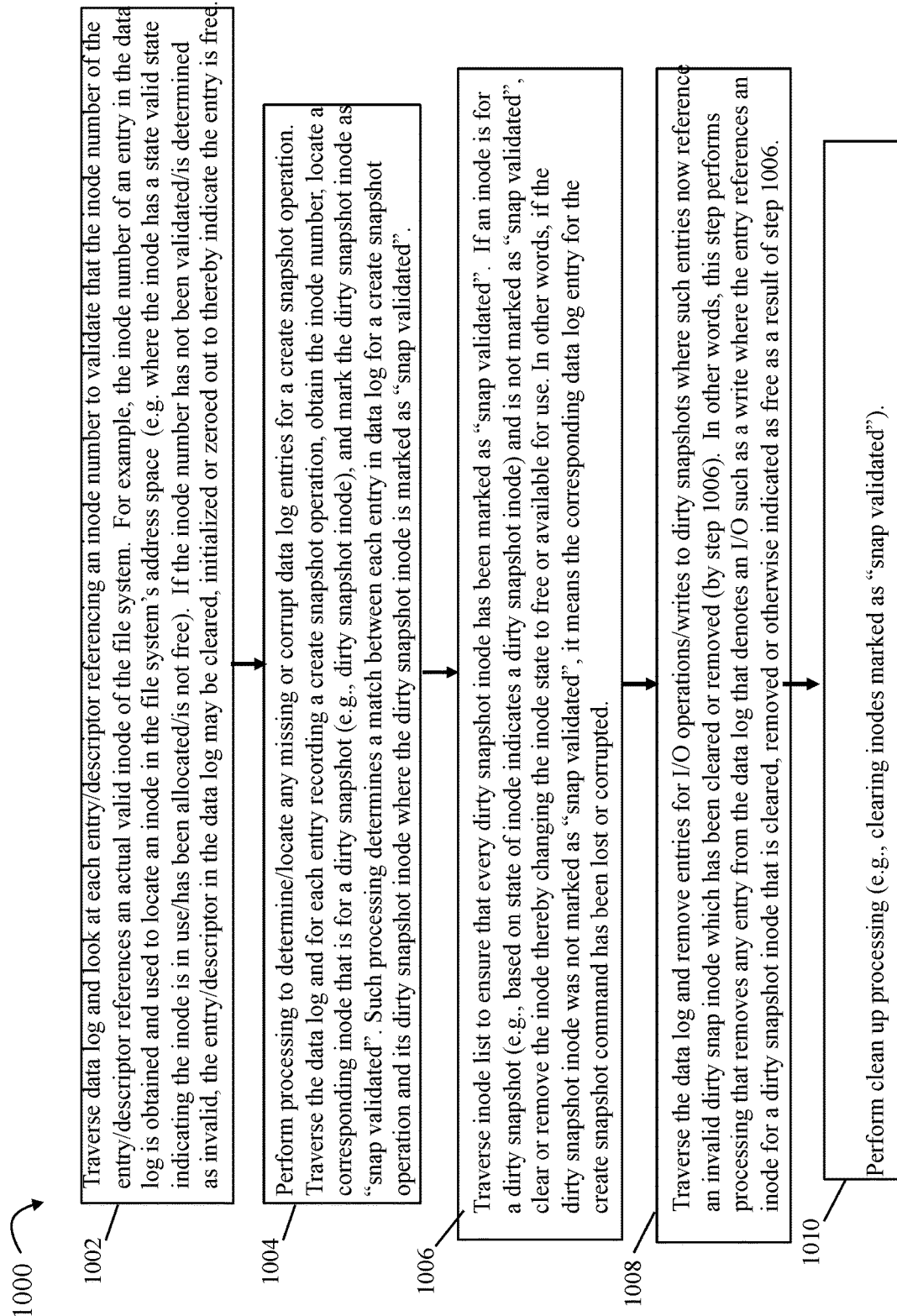

Referring to FIGS. 10 and 11, shown are flowcharts of processing steps that may be performed in an embodiment in accordance with techniques herein. The flowcharts 900 and 1000 generally summarize processing described above that may be performed in an embodiment in accordance with techniques herein.

Referring to FIG. 10, flowchart 900 includes step 902 where a determination is made as to whether a file system inconsistency has been detected. Different types of file system inconsistencies are known in the art and some are discussed herein. For example, such inconsistencies for the file system may generally include an inconsistency between a data log for the file system and inodes of the file system, wherein the data log includes entries corresponding to logged operations requested with respect to the file system. If step 902 evaluates to yes, control proceeds to step 906 where recovery processing is commenced to detect and correct file system inconsistencies and restore the file system to a consistent state. From step 906, processing continues with step 908 In step 908, the data log for the file system may be flushed to thereby implement or perform the recorded operations in the data log of the file system. If step 902 evaluates to no, control proceeds to step 904 to generally perform other processing besides recovery processing.

Referring to FIG. 11, flowchart 1000 includes processing steps that may be performed in accordance with the two phase recovery processing described above. At step 1002, processing may be performed to traverse the data log and look at each entry referencing an inode number to validate that the inode number of the entry references an actual valid inode of the file system. For example, the inode number of an entry in the data log is obtained and used to locate an inode in the file system's address space (e.g. where the inode has a state valid state indicating the inode is in use/has been allocated/is not free). If the inode number has not been validated/is determined as invalid, the entry in the data log may be cleared, initialized or zeroed out to thereby indicate the entry is free.

From step 1002, processing continues with step 1004. At step 1004, processing may be performed to determine/locate any missing or corrupt data log entries for a create snapshot operation. Step 1002 may include traversing the data log and, for each entry recording a create snapshot operation, obtain the inode number from the entry, locate a corresponding inode that is for a dirty snapshot (e.g., dirty snapshot inode), and mark the dirty snapshot inode as "snap validated". Such processing determines a match between each entry in data log for a create snapshot operation and its dirty snapshot inode where the dirty snapshot inode is marked as "snap validated".

From step 1004, processing continues with step 1006. At step 1006, processing may include traversing the inode list of the file system to ensure that every dirty snapshot inode has been marked as "snap validated". If an inode is for a dirty snapshot (e.g., based on state of inode indicates a dirty snapshot inode) and is not marked as "snap validated", processing is performed to clear or remove the inode thereby changing the inode state to free or available for use. In other words, if the dirty snapshot inode was not marked as "snap validated in step 1004", it means the corresponding data log entry for the create snapshot command has been lost or corrupted.

From step 1006, processing continues with step 1008. At step 1008, processing may include traversing the data log and removing entries for I/O operations, such as writes, to dirty snapshots where such entries now reference an invalid dirty snap inode which has been cleared or removed by step 1006). In other words, this step 1008 includes processing that removes any entry from the data log that denotes an I/O, such as a write, where the entry references an inode for a dirty snapshot inode that is cleared, removed or otherwise indicated as free as a result of step 1006.

From step 1008, processing continues with step 1010. At step 1010, any needed clean up processing may be performed. Step 1010 may include, for example, clearing the inodes marked previously as "snap validated".

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of performing processing for a file system comprising:
    determining, for the file system and using a processor, an inconsistency between a data log for the file system and inodes (index nodes) of the file system, wherein the data log includes entries corresponding to logged operations requested with respect to the file system; and
    responsive to determining the inconsistency between the data log for the file system and inodes of the file system, performing recovery processing using a processor, said recovery processing including:
        performing first processing of the data log, wherein said first processing includes:
            determining whether each entry of the data log, that records a create snapshot operation to create a snapshot of a file, has an associated inode of the file system that is a dirty snapshot inode; and
            responsive to determining said each entry of the data log, that records the create snapshot operation, has the associated inode that is a dirty snapshot inode, marking said associated inode, that is a dirty snapshot inode, as snap validated denoting validated consistency determined between said each entry of the data log recording the create snapshot operation and the associated inode that is a dirty snapshot inode;
        performing second processing of the inodes of the file system after performing said first processing of the data log, wherein said second processing includes:
            identifying each inode of the file system that is not marked by the first processing as snap validated wherein said each inode not marked as snap validated is a dirty snapshot inode without a corresponding data log entry; and
            responsive to identifying said each inode that is not marked by the first processing as snap validated, removing said each inode of the file system that is identified as a dirty snapshot inode without a corresponding data log entry and that is not marked by the first processing as snap validated; and
        performing third processing of the data log after said second processing of the inodes of the file system, wherein said third processing includes removing other entries of the data log referencing an invalid dirty snapshot inode that is removed by said second processing, wherein said other entries of the data log are not created for a snapshot creation operation.

2. The method of claim 1, wherein the inconsistency includes any one or more of:
  a write operation having an entry in the data log that refers to an invalid inode in the file system;
  a dirty snapshot inode for a first snapshot of a file in the file system that does not have a corresponding entry in the data log for an operation that creates the first snapshot; and
  an entry in the data log for an operation that creates a second snapshot of a file in the file system and the second snapshot does not have a corresponding dirty snapshot inode.

3. The method of claim 1, wherein the file system includes a first file that implements a logical device having storage provisioned from the file system.

4. The method of claim 3, wherein the logical device is a virtually provisioned logical device.

5. The method of claim 3, wherein the first file has a corresponding index node of the file system, the index node including metadata for the first file and the index node including a mapping structure of one or more indirect blocks and one or more data blocks that are mapped, using the one or more indirect blocks, to the index node for the first file.

6. The method of claim 5, wherein the data log includes a first entry that records a first operation to create a first snapshot of the first file, wherein the first snapshot of the first file denotes a first snapshot of the logical device.

7. The method of claim 6, wherein, responsive to receiving the first operation to create the first snapshot of the first file, processing is performed including:
  allocating a first index node of the file system for the first snapshot of the first file; and
  recording information in the first entry, the information including a first inode number of the first index node.

8. The method of claim 7, further comprising:
  flushing the data log including flushing the first entry; and
  responsive to said flushing the first entry, completing initialization of metadata of the first index node to reference a same set of data blocks allocated for the first file.

9. The method of claim 1, wherein said other entries of the data log are created for write operations.

10. A system comprising:
  one or more processors; and
  a memory comprising code stored therein that, when executed by at least one of the one or more processors, performs a method of performing processing for a file system comprising:
    determining, for the file system and using a processor, an inconsistency between a data log for the file system and inodes (index nodes) of the file system, wherein the data log includes entries corresponding to logged operations requested with respect to the file system;
    responsive to determining the inconsistency between the data log for the file system and inodes of the file system, performing recovery processing using a processor, said recovery processing including:
      performing first processing of the data log, wherein said first processing includes:
        determining whether each entry of the data log, that records a create snapshot operation to create a snapshot of a file, has an associated inode of the file system that is a dirty snapshot inode; and
        responsive to determining said each entry of the data log, that records the create snapshot operation, has the associated inode that is a dirty snapshot inode, marking said associated inode, that is a dirty snapshot inode, as snap validated denoting validated consistency determined between said each entry of the data log recording the create snapshot operation and the associated inode that is a dirty snapshot inode;
      performing second processing of the inodes of the file system after performing said first processing of the data log, wherein said second processing includes:
        identifying each inode of the file system that is not marked by the first processing as snap validated wherein said each inode not marked as snap validated is a dirty snapshot inode without a corresponding data log entry; and
        responsive to identifying said each inode that is not marked by the first processing as snap validated, removing said each inode of the file system that is identified as a dirty snapshot inode without a corresponding data log entry and that is not marked by the first processing as snap validated; and
      performing third processing of the data log after said second processing of the inodes of the file system, wherein said third processing includes removing other entries of the data log referencing an invalid dirty snapshot inode that is removed by said second processing, wherein said other entries of the data log are not created for a snapshot creation operation.

11. The system of claim 10, wherein said other entries of the data log are created for write operations.

12. A non-transitory computer readable medium comprising code stored thereon that, when executed using a processor, performs a method of processing for a file system comprising:
  determining, for the file system and using a processor, an inconsistency between a data log for the file system and inodes (index nodes) of the file system, wherein the data log includes entries corresponding to logged operations requested with respect to the file system; and
  responsive to determining the inconsistency between the data log for the file system and inodes of the file system, performing recovery processing using a processor, said recovery processing including:
    performing first processing of the data log, wherein said first processing includes:
      determining whether each entry of the data log, that records a create snapshot operation to create a snapshot of a file, has an associated inode of the file system that is a dirty snapshot inode; and
      responsive to determining said each entry of the data log, that records the create snapshot operation, has the associated inode that is a dirty snapshot inode, marking said associated inode, that is a dirty snapshot inode, as snap validated denoting validated consistency determined between said each entry of the data log recording the create snapshot operation and the associated inode that is a dirty snapshot inode;

performing second processing of the inodes of the file system after performing said first processing of the data log, wherein said second processing includes:
  identifying each inode of the file system that is not marked by the first processing as snap validated wherein said each inode not marked as snap validated is a dirty snapshot inode without a corresponding data log entry; and
  responsive to identifying said each inode that is not marked by the first processing as snap validated, removing said each inode of the file system that is identified as a dirty snapshot inode without a corresponding data log entry and that is not marked by the first processing as snap validated; and
performing third processing of the data log after said second processing of the inodes of the file system, wherein said third processing includes removing other entries of the data log referencing an invalid dirty snapshot inode that is removed by said second processing, wherein said other entries of the data log are not created for a snapshot creation operation.

13. The non-transitory computer readable medium of claim 12, wherein the inconsistency includes any one or more of:
  a write operation having an entry in the data log that refers to an invalid inode in the file system;
  a dirty snapshot inode for a first snapshot of a file in the file system that does not have a corresponding entry in the data log for an operation that creates the first snapshot; and
  an entry in the data log for an operation that creates a second snapshot of a file in the file system and the second snapshot does not have a corresponding dirty snapshot inode.

14. The non-transitory computer readable medium of claim 12, wherein the file system includes a first file that implements a logical device having storage provisioned from the file system.

15. The non-transitory computer readable medium of claim 14, wherein the logical device is a virtually provisioned logical device.

16. The non-transitory computer readable medium of claim 14, wherein the first file has a corresponding index node of the file system, the index node including metadata for the first file and the index node including a mapping structure of one or more indirect blocks and one or more data blocks that are mapped, using the one or more indirect blocks, to the index node for the first file.

17. The non-transitory computer readable medium of claim 16, wherein the data log includes a first entry that records a first operation to create a first snapshot of the first file, wherein the first snapshot of the first file denotes a first snapshot of the logical device.

18. The non-transitory computer readable medium of claim 17, wherein, the method includes, responsive to receiving the first operation to create the first snapshot of the first file, performing processing including:
  allocating a first index node of the file system for the first snapshot of the first file; and
  recording information in the first entry, the information including a first inode number of the first index node.

19. The non-transitory computer readable medium of claim 18, wherein the method further comprises:
  flushing the data log including flushing the first entry; and
  responsive to said flushing the first entry, completing initialization of metadata of the first index node to reference a same set of data blocks allocated for the first file.

20. The non-transitory computer readable medium of claim 12, wherein said other entries of the data log are created for write operations.

\* \* \* \* \*